(12) United States Patent
Watanabe et al.

(10) Patent No.: US 6,215,794 B1
(45) Date of Patent: Apr. 10, 2001

(54) MULTIPLE BAND CHANGE-OVER METHOD FOR MULTIPLEX COMMUNICATION EQUIPMENT

(75) Inventors: Sakae Watanabe; Kazumasa Azuma; Kaoru Suzuki; Ikuo Aso, all of Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 0 days.

(21) Appl. No.: 08/927,284

(22) Filed: Sep. 11, 1997

(30) Foreign Application Priority Data

Sep. 11, 1996 (JP) .................................................... 8-261228

(51) Int. Cl.[7] ................................. H04J 3/16; H04J 3/04
(52) U.S. Cl. .......................................... 370/468; 370/537
(58) Field of Search ..................................... 370/465, 468, 370/431, 437, 538, 518, 508, 535, 536, 537

(56) References Cited

U.S. PATENT DOCUMENTS

| 5,392,284 | * | 2/1995 | Sugiyama | 370/538 |
| 5,577,075 | * | 11/1996 | Cotton et al. | 370/508 |
| 5,673,253 | * | 9/1997 | Shaffer et al. | 370/468 |
| 5,708,664 | * | 1/1998 | Budge et al. | 370/465 |
| 5,721,738 | * | 2/1998 | Kubota et al. | 370/508 |
| 5,793,425 | * | 8/1998 | Balakrishnan | 370/468 |

* cited by examiner

Primary Examiner—Chau Nguyen
Assistant Examiner—Chiho Andrew Lee
(74) Attorney, Agent, or Firm—Foley & Lardner

(57) ABSTRACT

A multiplex communication system is provided with a plurality of multiplex communication equipment connected to each other through an exclusive line. The multiplex communication equipment have a plurality of a structure information for setting multiple bands. The multiple bands are changed over by changing-over the structure information on the basis of a previous-set schedule.

4 Claims, 4 Drawing Sheets

[Fig. 1]
PRIORITY ART
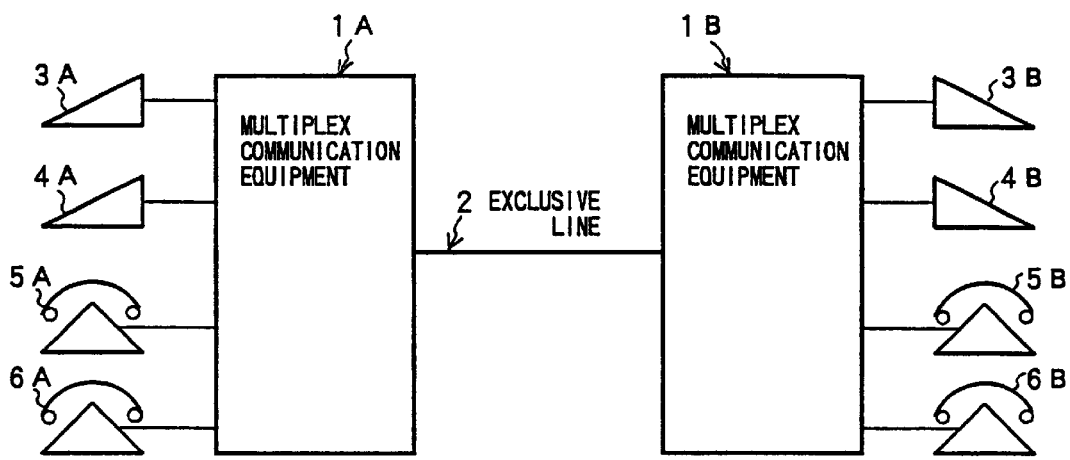
[Fig. 2]
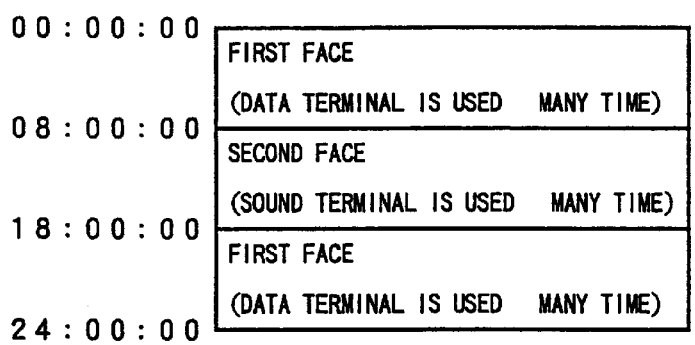

[Fig. 3]
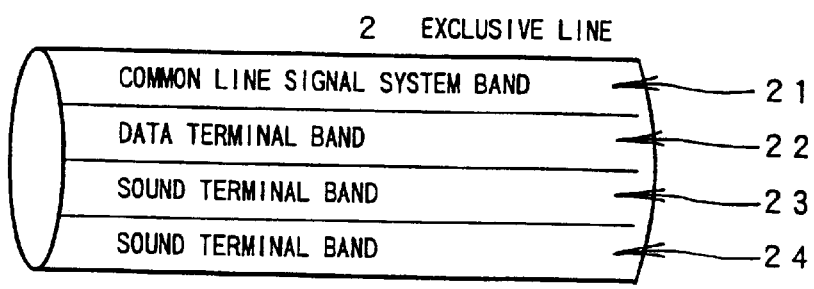
[Fig. 4]
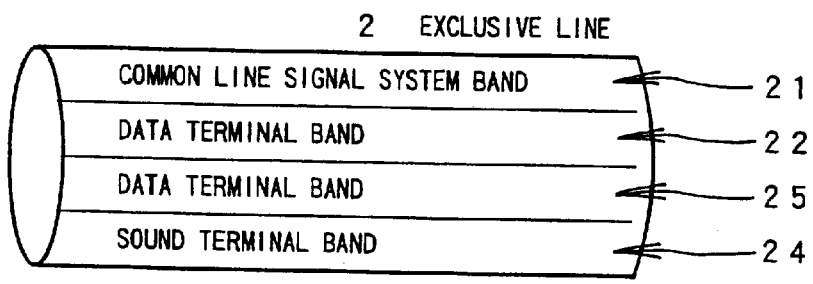

[Fig. 5]
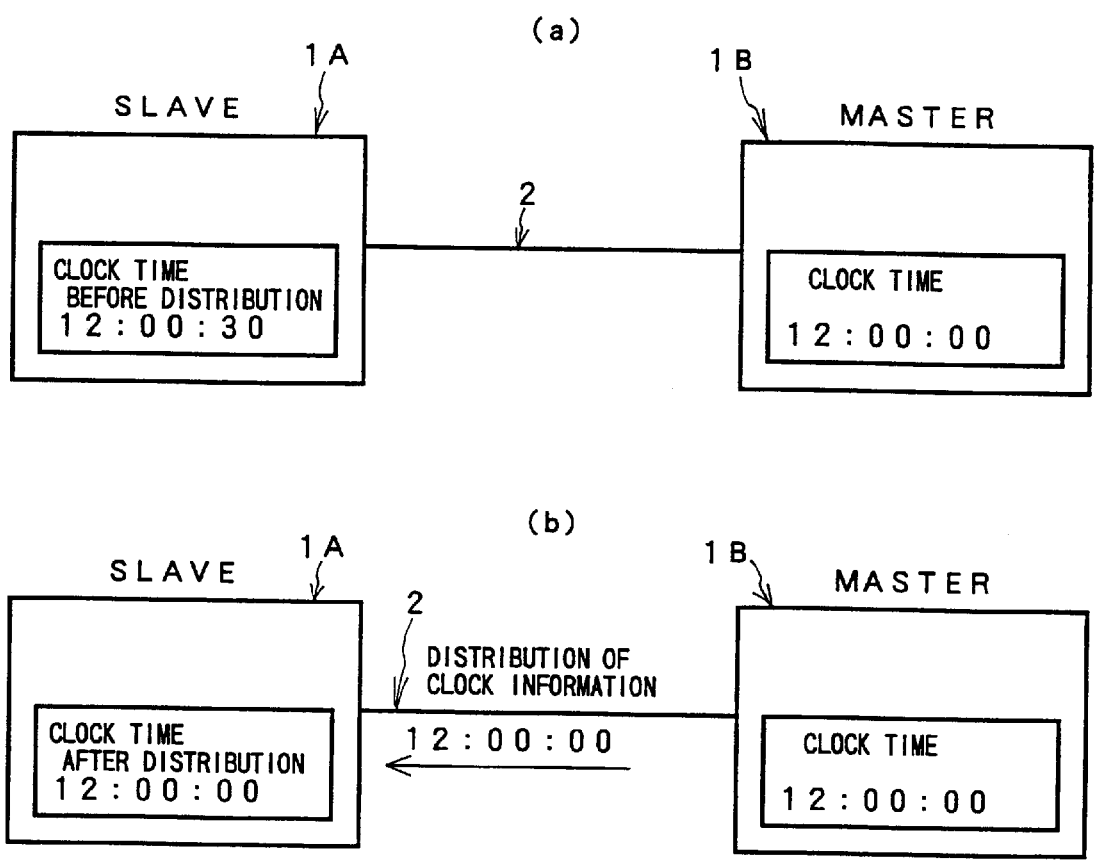

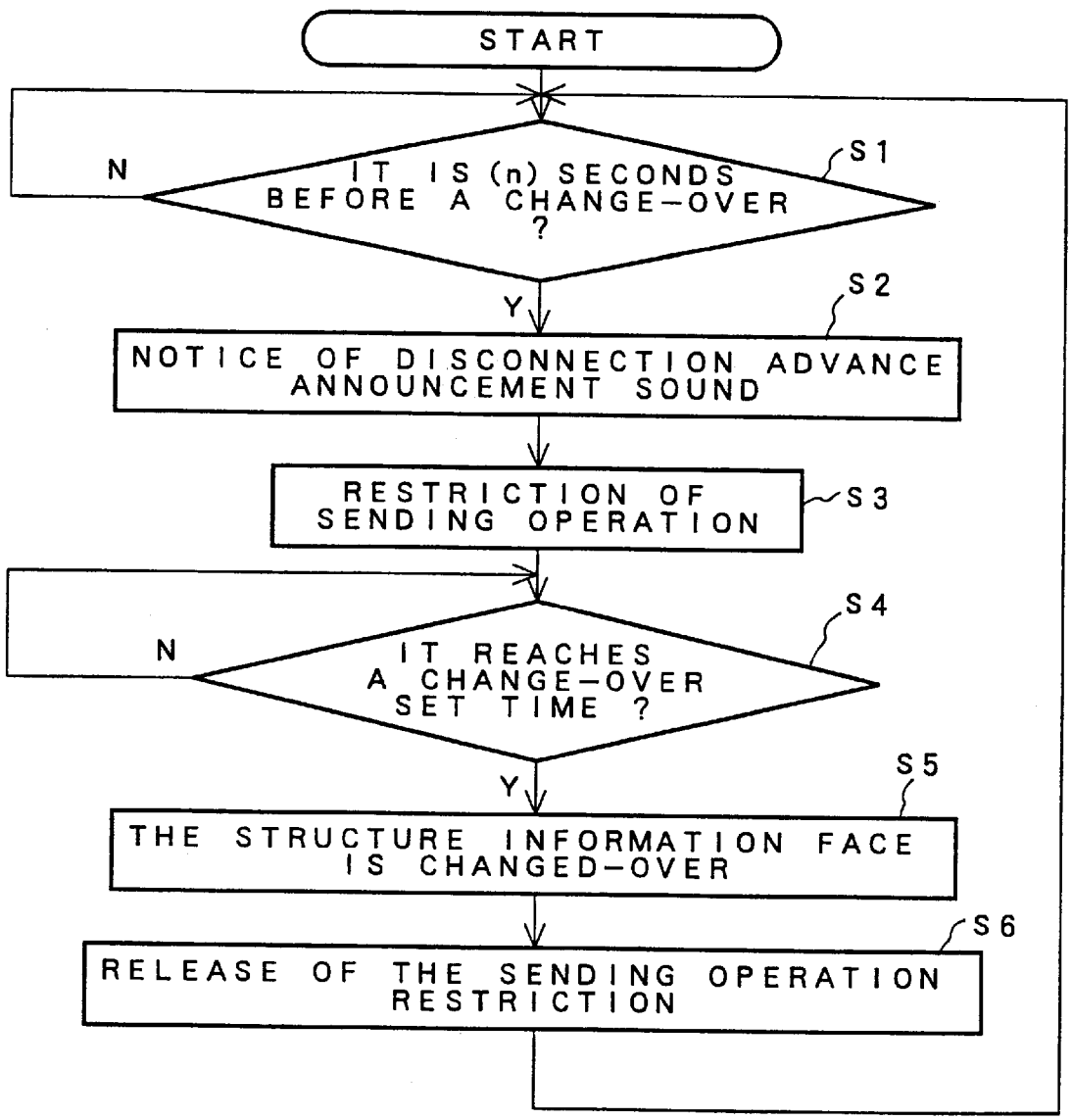
[Fig. 6]

MULTIPLE BAND CHANGE-OVER METHOD FOR MULTIPLEX COMMUNICATION EQUIPMENT

TECHNICAL FIELD OF THE INVENTION

The invention relates to a multiple band change-over method for the multiplex communication equipment in a multiplex communication system structured by a plurality of multiplex communication equipment, and is suitable to, for example, a multi-media multiplex equipment.

DESCRIPTION OF THE RELATED ART

Conventionally, in a multiplex communication system, the multiple band between equipment are set by structure information (equipment operation data) in order to assure multiplicity between these equipment. According to the conventional method above, the multiple bands must be assured during day and night even though there are some terminals used only during daytime or other terminals used only during nighttime.

If it is necessary to change over assignment of equipment to the multiple band in nighttime and daytime, a maintenance terminal is provided for every multiplex communication equipment, and a change management of the structure information is carried out by the maintenance terminal, or a maintenance surveillance center is connected to individual multiplex communication equipment through a public network in order to carry out a change-over management of the structure information.

According to the conventional method, when the maintenance terminal is provided every the multiplex communication equipment and the maintenance terminal changes over assignment of the multiple bands by the management of changing over the structure information, it is necessary to dispatch maintenance engineers, resulting in an increase of the maintenance cost. In addition, it is inconveniently necessary to keep a good communication in the network in order to prevent errors of the change-over time in the network from being generated.

In case that the maintenance surveillance center is connected to individual multiplex communication equipment through the public network and the management of changing over the structure information is done, each point or place must be individually changed, resulting in an inconvenience of generating a large time error before the management of changing over the structure information of whole network has been finished.

Also, when the multiple bands is changed over by changing over the structure information, the communication is temporarily disconnected. As a result, the communication user (user of the sound terminal) will experience the sudden disconnection. This gives an unpleasant impression to user.

SUMMARY OF THE INVENTION

The present invention solves such conventional problems. An object of the present invention is to provide a multiple band change-over method for multiplex communication equipment, by changing over the multiple band easily and with low-cost.

The invention includes, in a multiplex communication system provided with a plurality of multiplex communication equipment connected to each other by means of an exclusive line, a multiple band change-over method of the multiplex communication equipment having a plurality of structure information for setting the multiple bands, by which method the structure information faces are changed over on the basis of the previous set schedule in order to change over the multiple bands.

In another aspect of the invention, the previous-set schedule is set on the basis of the time information, and the structure information faces are changed over every time that is previously set.

In another aspect of the invention, the information of the inner clock of the master multiplex communication equipment in the plurality of the multiplex communication equipments is set in the inner clock of another multiplex communication equipment of a network, for every predetermined period or for a clock change of the master multiplex communication equipment.

In another aspect of the invention, when a disconnection in communication is going to happen due to a change-over of the structure information faces, the disconnection will happen at a fixed time before changing over the structure information faces that is noticed to a sound terminal connected to the multiplex communication equipment.

In another aspect of the invention, when a disconnection in communication is going to happen due to a change-over of the structure information faces, a sending operation is restricted from a fixed time of changing over the structure information faces to a time when the structure information faces are changed over.

According to the invention, multiple bands are changed-over according to the previous-set schedule, for example, time without a manual operation by the maintenance engineer with reference to any change of multiple bands, so it is possible to effectively use an exclusive line.

Also, when the multiple bands are changed over according to time, the inner clock of the master multiplex communication equipment and an inner clock of another multiplex communication equipment are made coincident with each other periodically or for every clock change of the master multiple communication equipment, so that it is possible to make the change error in the network very small.

According to the invention, when the communication is temporarily disconnected due to changing over from one structure information to another structure information, the user is made aware of this in advance, and so it is possible to avoid an unpleasant situation for the user.

BRIEF DESCRIPTION OF THE DRAWINGS

FIG. 1: a structure view of the multiplex communication system to which the invention is applied.

FIG. 2: an example of the schedule for changing-over structure information according to time.

FIG. 3: an example of multiplex lines use in daytime.

FIG. 4: an example of multiplex lines use in the nighttime.

FIG. 5 (*a*) to (*b*): examples of clock information distribution system.

FIG. 6: a flow chart showing the structure information exchanging procedure.

DETAILED DESCRIPTION OF THE PREFERRED EMBODIMENT

FIG. 1 is a structure view of a multiplex communication system to which the invention is applied. Two multiplex communication equipment 1A, 1B are connected to each other by an exclusive line 2. To the multiplex communication equipment 1A, data terminal equipment (DTE) 3A, 4A and sound terminal equipment 5A, 6A are connected. To the multiplex communication equipment 1B, data terminal equipment (DTE) 3B, 4B and sound terminal equipment 5B,6B are connected.

FIG.2 shows one example of the schedule for changing over the structure information according to time. In this example, it is set that the structure information is changed over at eight o'clock a.m. (08:00:00) and eighteen hundred hours, or six o'clock p.m. (18:00:00). As shown, concerning a daytime from 8 a.m. to 6 p.m. in which the sound terminal is typically used many times, the structure information having many available sound terminals is registered as the second structure information, and for nighttime hours from 6 p.m. to 8 a.m. in which the data terminal is typically used many times, the structure information having many available data terminals is registered as the first structure information.

Additionally, the invention is not limited to the schedule for changing over the structure information according to the hour (o'clock) time, and the invention is able to use the other schedules to change according to time, the number of times, the number of structure information stored, what day of the week, date, etc.

FIG. 3 shows the assignments of the multiple bands of the exclusive line 2 and a use example in the daytime as shown in FIG. 2 depicting the exclusive line 2 being used to a common line signal system band 21, a data terminal band 22, and sound terminal bands 23, 24. No data communication is carried out between the data terminal equipment 3A, 3B in order to give priority to the sound communication in the day time (by assigning these bands in the exclusive line 2), so the structure information doesn't firmly hold any band for the no-use terminals.

FIG. 4 shows the assignments of the multiple bands of the exclusive line 2 and a use example in the nighttime as shown in FIG. 2. The exclusive line 2 is used for the common line signal system band 21, the data terminal bands 22, 25, and the sound terminal band 24. In the nighttime, in order to give priority to data communication by the data terminal equipment 3A, 3B, the sound terminal band which has been used by the sound terminal equipment 5A, 5B is changed to a data terminal band and this band is used between the data terminal equipment 3A and 3B.

FIG. 5(a) is a system structure example for distributing the clock information to the multiplex communication equipment. An inner clock of the multiplex communication equipment 1B of a master shows "12:00:00". On the contrary, an inner clock of the multiplex communication equipment 1A of a slave shows "12:00:30". There is a time difference of 30 seconds between these multiplex communication equipment 1A and 1B.

Now as shown in FIG. 5(b), information of the inner clock from the multiplex communication equipment 1B at the master side is sent to the multiplex communication equipment 1A at the slave side by using the common line signal system band in the exclusive line 2. The slave multiplex communication equipment 1A sets the distributed clock information in the inner clock, making the clock time difference smallest between the slave multiplex communication equipment and the master multiplex communication equipment.

Next, a change-over sequence of the structure information according to a time monitoring based on the schedule shown in FIG. 2 will be explained with reference to a flow chart shown in FIG. 6.

First, it is judged whether it is (n) seconds before changing over the structure information or not (step S1). When it is (n) seconds before changing over the structure information, a notice operation of a disconnection advance announcement sound is carried out (step S2), and the sending operation restriction is carried out (step S3). Next, when it reaches a change-over set time (step S4), the structure information face is changed over (step S5), the sending operation restriction is released (step S6), returning to a monitoring operation (n) seconds before the change-over to the next change-over and monitoring again continuously the change-over time.

According to the invention, the multiple bands are changed over according to a previous-set schedule, for example, without requiring a manual operation by a maintenance engineer on the change-over and the like of multiple bands, so that it is possible to effectively use the exclusive line and to reduce the cost of communication.

Also, when the multiple bands are changed over according to the time, the inner clock of the master multiplex communication equipment and another clock of another multiplex communication equipment are made coincident periodically or for every clock change of the master multiplex communication equipment, and so it is possible to make a time difference (error) between these equipment in the whole network very small.

Additionally, because an advance announcement of temporary disconnection of communication due to changing over the structure information is given to the users, it is possible to reduce displeasure to the users at communication disconnection due to changing the structure information of the equipment.

What is claimed is:

1. A multiple band change-over method for a multiplex communication equipment in a multiplex communication system having a plurality of multiplex communication equipment connected to each other by means of an exclusive line within a network, the method comprising the steps of:

providing the multiplex communication equipment with a plurality of structure information for setting content of allotting predetermined bands in the exclusive line, the structure information corresponding to allocation of each of the predetermined bands to a particular type of communication within said each of the predetermined bands, and changing, by the multiplex communication equipment, structure information corresponding to a change-over set time when reaching the change-over set time on a basis of the previous-set schedule for setting the change-over set time, wherein the multiplex communication equipment allots each of the predetermined bands in the exclusive line on the basis of the changed structure information, and wherein the multiplex communication equipment regulates a sending operation for sending information over the exclusive line in a period starting from a fixed time before the change-over set time and ending at the the change-over set time.

2. The multiple band change-over method according to claim 1, wherein information of an inner clock of a master multiplex communication equipment is set in an inner clock of another multiplex communication equipment in the network, for every predetermined time period or for every clock change of the master multiplex communication equipment.

3. The multiple band change-over method according to claim 1 wherein, before a disconnection in communication will happen based upon changing over the structure information, the multiplex communication equipment notifies, at the fixed time before the start of changing over structure information, to a sound terminal connected to the multiplex communication equipment that the disconnection will happen, the sound terminal outputting an audible notification to a user of the multiplex communication equipment regarding the disconnection.

4. The multiple band change-over method according to claim 1,
wherein information of an inner clock of a master multiplex communication equipment is set in an inner clock of another multiplex communication equipment in the network, for every predetermined time period or for every clock change of the master multiplex communication equipment.

* * * * *